B. K. HALL.
TURN TABLE.
APPLICATION FILED JAN. 31, 1914.
1,143,538. Patented June 15, 1915.
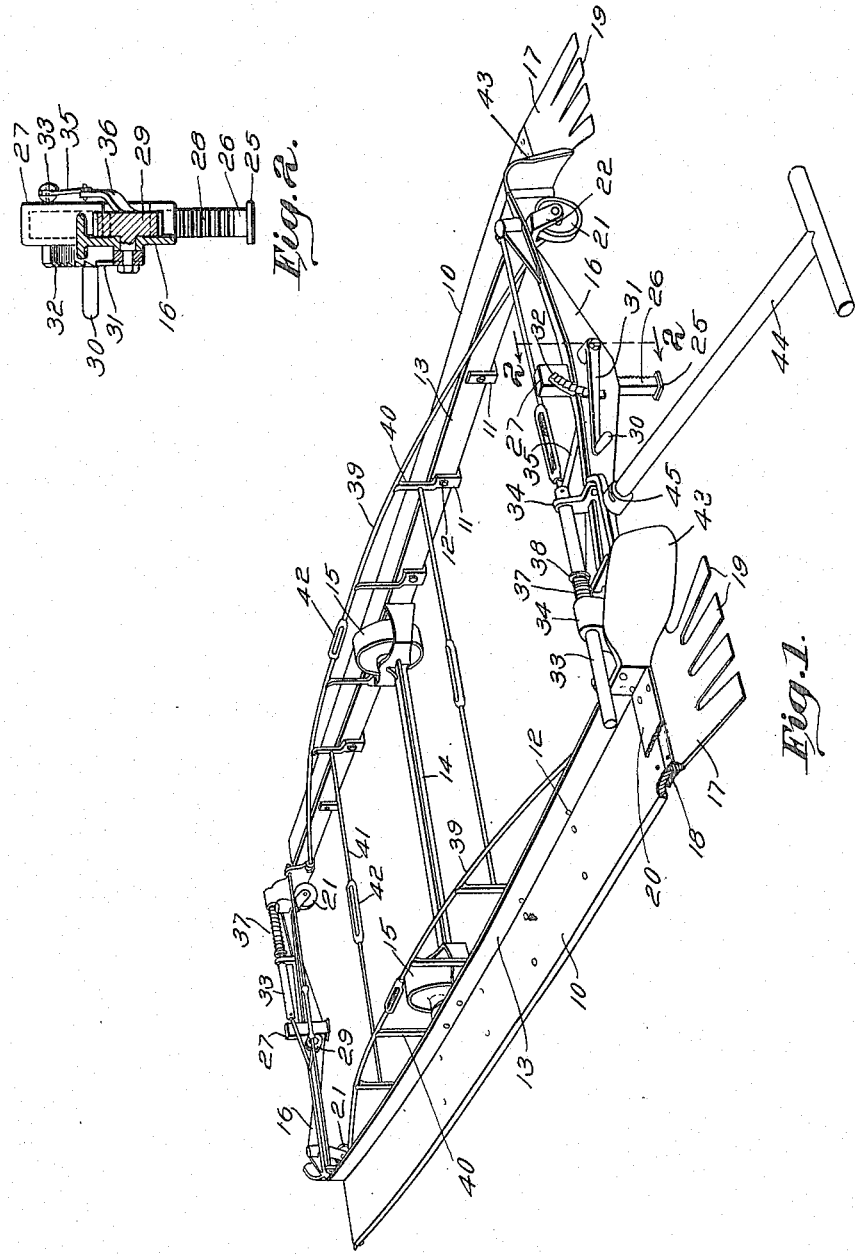
Witnesses,
Mary C. Smith
Walter E. Lombard
Inventor,
Benjamin K. Hall,
By Roswell F. Hatch
Atty.

UNITED STATES PATENT OFFICE.

BENJAMIN K. HALL, OF BOSTON, MASSACHUSETTS, ASSIGNOR TO WILLIAM H. MITCHELL, OF NEWTON, MASSACHUSETTS.

TURN-TABLE.

1,143,538.    Specification of Letters Patent.    Patented June 15, 1915.

Application filed January 31, 1914. Serial No. 815,593.

*To all whom it may concern:*

Be it known that I, BENJAMIN K. HALL, of Boston, in the county of Suffolk, Commonwealth of Massachusetts, have invented certain new and useful Improvements in Turn-Tables, of which the following is a specification.

This invention relates to turntables for automobiles and more particularly to portable turntables which may be used to transport automobiles from one part of a garage to another.

The object of the invention is to provide a turntable of the character described which is strong and light, easily manipulated by one person, and which can be used without any floor attachments. The various features employed to the accomplishment of this object and such others as may hereinafter appear, will best be understood from the following description and accompanying drawings, in which:

Figure 1 is a perspective view of the preferred embodiment of the improved turntable, and Fig. 2 is a section on the line 2—2 on Fig. 1.

The wheels of the automobile are supported upon two platforms 10 which are carried by a series of brackets 11, the upright ends of which are fastened by bolts 12 to two bars 13 extending lengthwise of the table. The bars 13 are joined near the middle by a frame 14 which carries a pair of wheels 15 which form the main support of the table. The wheels 15 are mounted so as to hold the platforms 10 slightly above the floor which permits the table to tilt about the axis of the wheels as a center.

The ends of the table consist of two yokes 16 which join the bars 13 and support and protect the ends of the platform. A description of one of these yokes will be sufficient as they are not both alike. The yoke is preferably made of cast steel and provided with two horizontally extending plates 17 in alinement with the platforms 10. The rear portion of each plate is provided with a recess 18 to receive and support the end of the platform and the forward end is flared and forked at 19 to provide a suitable end onto which the automobile may be driven. As the platforms 10 are preferably made of wood to save weight, the plates 17 prevent the wood from breaking and splintering with use. The joint between the plate and the platform may be covered with a sheet-iron plate 20.

The yokes 16 are provided with wheels 21 near each corner of the table to permit the table to be moved bodily over the floor or to be turned about an axis within the table. Each wheel 21 is carried in a fork 22 which is mounted for rotation about a vertical axis. Ball bearings may be provided, if desired, to reduce the friction between the fork and the yoke. It is desirable that the table shall tilt so as to lower the end upon which the car is to be driven. To permit this tilting movement, the wheels 21 are mounted with their floor engaging surfaces in a higher plane than the corresponding surfaces of the center wheels 15 and in such position that the projecting ends of the plates 17 just clear the floor when one pair of the wheels 21 are in contact therewith.

When a car is run onto the depressed end of the table, it often happens that the table will roll away from the car when the tires strike the plates 17. For this reason it is desirable that mechanisms be provided to hold the table in a fixed position on the floor. It is also necessary, with certain types of automobiles, to provide means for holding the raised end of the table in its elevated position so that the table cannot tilt when the front wheels of the car pass the center wheels 15. The table is held in tilted position by a floor engaging foot 25 having connection with the table by which the table may be lifted. It is obvious that lifting the table causes the foot to exert pressure on the floor which prevents the table from moving as the car is driven on. The foot 25 is formed on the bottom of a bar 26 mounted for vertical movement in a housing 27 formed integral with the yoke 16. One side of the bar 26 is provided with a rack 28 which meshes with a pinion 29 mounted in the yoke 16. The pinion is rotated to move the foot by means of a handle 30 on the end of a lever 31 secured to the shaft of the pinion, which extends through the yoke. The lever is formed from comparatively thin metal so that it is deflected as it passes over a series of detents 32 cast on the yoke 16. These detents serve to hold the arm in position with the end of the table elevated and with sufficient pressure on the foot to hold the table from moving. The foot is released by springing the lever outwardly so that it clears the detents.

It has been found that there is a danger, especially in the dark, of over-running the table so that the front wheels of the car drop off the elevated end. In order to prevent this, a stop is provided which automatically positions itself in the path of the automobile wheel when the end of the table is lifted. The stop may comprise a bar 33 mounted for longitudinal movement in lugs 34 on the yoke 16 and adapted to be projected over the end of the platform 10. The bar is moved into operative position by a link 35 connecting one end of the bar with an arm 36 extending from the pinion 29 in alinement with the lever 31. It is apparent that movement of the lever 31 to depress the foot will project the bar over the platform, as shown at the right end of Fig. 1. The foot and bar are both returned to inoperative position by a spring 37 surrounding the bar 33 between one of the lugs 34 and a washer 38 fixed on the bar.

The table is braced and strengthened longitudinally by truss-rods 39 which pass over standards 40 projecting from certain of the brackets 11, and laterally by tie-rods 41, all of which are provided with turnbuckles 42. The yoke 16 also has flanges 43 to guide the wheels onto the platform.

A handle 44 is constructed to be attached to either end of the table by a collar 45 which locks the handle to one of two forks 46 pivotally mounted on the respective yokes.

In the use of the present invention, the handle 30 on the opposite end of the table from which the car is to be driven, is first turned which raises that end of the table until the wheels 21, on the opposite end, rest on the floor. The rotation of the handle is continued for about the width of one of the detents 32 which lifts the table slightly and so makes a firm engagement between the floor and the foot which effectually prevents the table from slipping when the car is driven thereon. The same movement of the handle projects the stop bar 33 into operative position. The parts are securely held in this position by the detents 32. The car may now be driven upon the lower end of the table without danger of moving the table or running off the rear end.

The car is stopped, as nearly as may be, over the center wheels 15 and the brakes are set. The lever is then freed from the detents and the stop bar and foot are at once retracted by the spring 37. The handle 44 may be attached to whichever end of the table is most convenient and the table with the automobile thereon may be turned in its own length or moved about the garage.

When the car is to be removed from the table, the lever at the rear of the car is turned to raise that end after which the car may be run off.

The fact that the car is to some extent balanced on the large center wheels 15, which are preferably provided with roller bearings, makes the table very easy to turn or move. The portable feature is of value in saving space by permitting a car to be turned and backed through narrow and crooked passageways into storage space, which would otherwise be inaccessible on account of room required to turn the car.

It is to be understood that the invention is not limited to the exact construction and arrangement of parts illustrated and described, as these may be varied and modified by any skilled mechanic without departing from the spirit of the invention as defined in the appended claims.

What is claimed as new, is:—

1. A turn-table for automobiles having supporting wheels, means for frictionally engaging the floor, and means for moving the floor engaging means to exert a lifting power on the table.

2. A turn-table for automobiles having a pair of wheels to support the table midway of its length, a floor engaging foot at each end of the table, and means for imparting a relative movement between the foot and the table whereby the foot is pressed upon the floor.

3. A turn-table for automobiles having a pair of wheels to support the table midway of its length, a floor engaging foot at each end of the table, means for imparting a relative movement between the foot and the table whereby the foot is pressed upon the floor, means for locking the foot in projected position, and a spring to return the foot to inoperative position.

4. A turn-table for automobiles comprising means for holding the table immovable upon the floor, a stop to limit the movement of the automobile on the table, and means for rendering the holding means and the stop inoperative.

5. A turn-table for automobiles comprising supporting wheels, means for frictionally engaging the floor, a stop to position the automobile on the table, and a single means for rendering the floor engaging means and the stop operative.

6. A turn-table for automobiles comprising a pair of centrally positioned wheels to support the table, means for lifting the end of the table, a stop to position an automobile on the table, and connections between the lifting means and the stop whereby the stop is rendered operative when the end of the table is lifted.

7. A turn-table for automobiles comprising axially alined wheels near the middle of the length of the table, wheels at each end of the table having their floor engaging surfaces in a higher plane than the corresponding surfaces of the middle wheels, means to permit free rotation of the end wheels about a vertical axis, a vertically movable foot at each end of the table, and means for causing a relative movement between the feet and the table whereby one end of the table may be supported by the foot.

8. A turn-table for automobiles mounted on centrally positioned wheels for a longitudinal tilting movement, a vertically movable foot at each end of the table, a rack, and pinion connected with the foot, a lever on the pinion, and means for locking the lever with the foot in projected position.

9. A turn-table for automobiles mounted on centrally positioned wheels for a longitudinal tilting movement, a vertically movable foot at each end of the table, a rack connected with the foot, a pinion in mesh with the rack, a lever for turning the pinion, means for locking the lever when the foot is projected, a stop to position the automobile on the table, and connections between the pinion and the stop whereby the stop is rendered operative when the foot is projected.

10. A turn-table for automobiles having a pair of platforms to support the automobile wheels, a bar extending inside of each platform, a frame connecting the bars near the center of the table and carrying a pair of table supporting wheels, and a yoke at each end of the table connecting the bars, having a plate at each end thereof forming a continuation of the platform and a support therefor.

11. A turn-table for automobiles comprising two bars extending longitudinally of the table, brackets secured to the bars and extending on the outside thereof, a platform secured to the brackets adjacent each bar, a frame connecting the middle of the bars and provided with table supporting wheels, yokes connecting the adjacent ends of the bars and provided with wheels movable about a vertical and a horizontal axis, and horizontally extending plates on the yokes forming extensions on the ends of the platforms.

12. A turn-table for automobiles comprising platforms to support the wheels of the automobile, a normally inoperative stop bar at each end of the table, and means for moving the stop bars to project over the platform.

In testimony whereof, I have affixed my signature, in the presence of two witnesses.

BENJAMIN K. HALL.

Witnesses:
JOSEPH EARL PERRY,
ROSWELL F. HATCH.

Copies of this patent may be obtained for five cents each, by addressing the "Commissioner of Patents, Washington, D. C."